United States Patent [19]

Goldstein et al.

[11] 3,858,273

[45] Jan. 7, 1975

[54] CORRUGATED PAPERBOARD COMPOSITIONS

[75] Inventors: Herman B. Goldstein, Cranston; John T. Ouderkirk, Westerly, both of R.I.

[73] Assignee: Sun Chemical Corporation, New York, N.Y.

[22] Filed: May 11, 1971

[21] Appl. No.: 142,341

[52] U.S. Cl. ......... 161/133, 117/155 L, 117/161 L, 260/69 R, 260/70 R
[51] Int. Cl. ............................................. B32b 3/28
[58] Field of Search ..... 161/133; 117/155 L, 161 L; 260/70 R, 69 R

[56] References Cited
UNITED STATES PATENTS

| | | | |
|---|---|---|---|
| 2,765,243 | 10/1956 | Aycock | 260/70 R |
| 2,826,500 | 3/1958 | Keim | 117/155 L |
| 2,876,062 | 3/1959 | Torke et al. | 260/70 R |
| 3,402,068 | 9/1968 | Wilkins | 117/155 L |
| 3,431,162 | 3/1969 | Morris | 161/133 |

*Primary Examiner*—William D. Martin
*Assistant Examiner*—Janyce A. Bell
*Attorney, Agent, or Firm*—Cynthia Berlow

[57] ABSTRACT

The wet rigidity of corrugated paperboard is improved by impregnating the medium with a slow-curing glyoxal-based resin in the presence of a catalyst and, optionally, an extender.

3 Claims, No Drawings

CORRUGATED PAPERBOARD COMPOSITIONS

This invention relates to a corrugated paperboard composition. More particulary it relates to improving the rigid-when-wet properties of corrugated paperboard by impregnating the medium with a glyoxal-based resin.

Maintaining stiffness or rigidity under wet or high humidity conditions has long been a problem in the corrugated box industry. For many years corrugated paperboard was made with a bituminous layer between plies of the sheet; this type of corrugated paperboard, however, lacks the wet strength required for stacking, especially when the product is in direct contact with water or in a moisture-laden atmosphere for a long time.

The resistance of these products to moisture vapor has been improved by coating them with waxes, but unmodified waxes tend to crack and peel, and the use of waxes modified with polymers or copolymers has the disadvantages of high cost, the high temperatures necessary to blend the mixtures, and the relative incompatibility of some of these polymer additives. Boxes made of corrugated paperboard which has been wax-saturated and then curtain-coated are satisfactory to an extent, but even these boxes fail after water finally gets past the wax barrier.

Impregnating paper with certain resins, e.g., ureas, melamines, and phenolics, is known, but the use of such resins in corrugating medium has not been successful because they cure at normal paper machine temperatures. The paper saturated therewith becomes excessively brittle when the resin is cured and cannot be rolled without cracking, thus making it unsuitable for the corrugating process.

It has now been found that a paperboard for use in corrugated boxes having excellent wet rigidity can be obtained by impregnating the corrugating medium, i.e., the web of paper, usually made from NSSC pulp or unbleached Kraft, which is fluted on a corrugating machine and then glued between inner and outer linerboard with a glyoxal-based resin in the presence of a catalyst and, if desired, an extender.

The resin additives of this invention may be any suitable slow-curing glyoxal resin or derivative thereof, e.g., the reaction product of glyoxal, urea, and formaldehyde or a substance which yields formaldehyde. It may be prepared, for example, by first heating the glyoxal and the urea to form a monourein which is then treated with formaldehyde or by reacting glyoxal and formaldehyde and then adding the urea. Typical compounds include, but are not limited to, dimethylol dihydroxy cyclic ethylene urea, partially alkylated dimethylol dihydroxy-ethylene urea, alkylated dimethylol dihydroxyethylene urea, and the like.

The amount of resin solids in the corrugating medium may range from about 2 to 10, and preferably from about 5 to 6, per cent resin solids based on the weight of the medium.

Any one or a combination of a wide variety of acid or latent acid catalysts may be employed, such as for example metal salts, amine hydrochlorides, carboxylic acids, hydroxy-substituted carboxylic acids, alkoxy-substituted carboxylic acids, and the like, and mixtures thereof. Examples include, but are not limited to, magnesium chloride, magnesium chloride hexahydrate, magnesium iodide, magnesium nitrate hexahydrate, magnesium acetate tetrahydrate, zinc chloride, zinc borofluoride, zinc silicofluoride, zinc nitrate hexahydrate, zinc acetate dihydrate, ammonium chloride, ammonium nitrate, ammonium sulfate, ammonium phosphates, sodium hydrogen sulfate, potassium persulfate, strontium nitrate, zirconium acetate, zirconium oxychloride, aluminum acetate, chromium acetate, tartaric acid, citric acid, oxalic acid, lactic acid, succinic acid, valeric acid, maleic acid, phosphoric acid, boric acid, sulfonic acid, perchloric acid, persulfuric acid, p-toluenesulfonic acid, sulfuric acid, methoxyacetic acid, hydroxybutyric acid, glycolic acid, the hydrochloride of 2-amino-2-methyl-1-propanol, and the like, and their mixtures. The catalyst is used in an amount ranging from about 1 to 50, and preferably about 12 to 15, per cent based on the total weight of the resin solids in the medium.

If desired, an extender such as starch may be added to the composition. Suitable starches include oxidized starch (for example, National Starch's Flo-Kote 64), cationic starch, ethylated starch, acid-modified starch, and the like. The amount of extender, if employed, is generally within the range of about 1 to 5, and preferably about 2 to 3, per cent based on the total weight of the corrugating medium or at a ratio of about two parts of resin solids per part of starch solids.

Generally the improved corrugated paperboard compositions of this invention are prepared by mixing the resin and the catalyst with the extender, if employed. If used, either the starch must first be cooked and then added to the resin and catalyst or the resin and catalyst may be added to the precooked starch. The web of the corrugating medium is saturated with the mixture, for example by means of a size press on the paper machine, by spraying onto the wet web, by using an off-machine saturator, or the like. The treated medium is dried under normal paper machine temperatures without effecting the cure of the resin, e.g., about 220° to 250°F. Under some circumstances the dried treated medium is passed over a chilling roll to cool it before it is rolled up. The medium is later fluted at which time the resin is post-cured by heating at about 300° to 375°, and preferably about 350° to 375°F., for about 30 seconds to 4 minutes, and preferably about 30 seconds to 2 minutes.

After the medium has been fluted and the resin therein post-cured, rigid-when-wet properties are exhibited. The fluted medium is generally glued to linerboard at the corrugator and later die-cut into boxes. The wet rigidity of the treated medium enables the entire formed box to withstand compression under high moisture conditions.

The resins of this invention are particularly useful in corrugating medium because they are slow-curing, which makes post-curing feasible. In other words, the resin is not fully cured until after the impregnated paper has been fluted and subsequently heated. Because the resin is not cured until after corrugation, the impregnated paper is not brittle and can be easily handled, e.g., rolled, without cracking.

Wet rigidity was determined by the Ring Crush test as follows:

Samples of the treated medium were initially dried on a drum dryer at 220°F. for 4 minutes. The samples were then post-cured for 3 minutes at 350°F., cut into 0.5 × 6-inch strips, immersed in distilled water at 72°F. for 16 hours, and tested on an Instron compression machine in accordance with TAPPI Standards T402 and T472 su-68. Results are reported as the average load in pounds required to crush the test strips.

The more detailed practice of the present invention is illustrated by the following examples. These examples are illustrative only and are not intended to limit the invention except as indicated by the appended claims.

EXAMPLE 1

33 Corrugating medium sheets were saturated for 2 seconds in a mixture of dimethylol dihydroxyethylene urea (DMDHEU), a zinc nitrate-magnesium chloride catalyst, and cooked oxidized starch to obtain the following solids pickup on the weight of the paper:
- 5.0 per cent of DMDHEU
- 0.6 per cent of catalyst
- 2.5 per cent of starch The paper was dried on a drum dryer for 4 minutes at 220°F., corrugated, and later post-cured in an oven for 3 minutes at 350°F. Samples of the treated sheets were tested as described above, and the results are tabulated below.

EXAMPLE 2

The procedure of Example 1 was repeated except that the treating solution was made without starch to obtain the following solids pickup:
- 5.0 per cent of DMDHEU
- 0.6 per cent of catalyst

EXAMPLE 3

The procedure of Example 1 was repeated except that the treating solution was made without the catalyst to obtain the following solids pickup:
- 5.0 per cent of DMDHEU
- 2.5 per cent of oxidized starch

EXAMPLE 4

The procedure of Example 1 was repeated except that the treating solution was made up to obtain the following solids pickup on the weight of the paper:
- 4.0 per cent of DMDHEU
- 0.5 per cent of catalyst
- 2.0 per cent of starch

EXAMPLE 5

The procedure of Example 1 was repeated except that the treating solution was made up to obtain the following solids pickup:
- 6.3 per cent of DMDHEU
- 0.8 per cent of catalyst
- 3.15 per cent of starch

EXAMPLE 6

The procedure of Example 1 was repeated except that the post-cure temperature was 300°F.

EXAMPLE 7

The procedure of Example 1 was repeated except that the post-cure temperature was 325°F.

EXAMPLE 8

The procedure of Example 1 was repeated except that the dried treated paper was not post-cured.

TABLE

| | RING CRUSH | | |
|---|---|---|---|
| | M.D. Dry (pounds) | M.D. Wet (pounds) | % wet/dry control |
| Control (untreated No. 33 corrugating medium) | 150.4 | 18.1 | 12.0 |
| Product of Example | | | |
| 1 | | 60.5 | 40.2 |
| 2 | | 49.4 | 32.8 |
| 3 | | 21.6 | 14.4 |
| 4 | | 37.5 | 24.9 |
| 5 | | 66.8 | 44.4 |
| 6 | | 28.1 | 18.5 |
| 7 | | 37.9 | 25.2 |
| 8 | | 18.1 | 12.0 |

EXAMPLE 9

The procedures of Examples 1, 2, and 3 were repeated with each of the following resins instead of DMDHEU: partially methylated DMDHEU and methylated DMDHEU. The results were comparable.

EXAMPLE 10

The procedures of Examples 1 and 2 were repeated except with each of the following catalysts instead of the mixture of zinc and magnesium salts: zinc nitrate, magnesium chloride, ammonium chloride, ammonium phosphate, magnesium iodide, lactic acid, citric acid, methoxyacetic acid, glycolic acid, the hydrochloride of 2-amino-2-methyl-1-propanol, and a mixture of hydroxyacetic acid and the organic amine hydrochloride. The results were comparable.

EXAMPLE 11

The procedures of Examples 1, 2, and 3 were repeated with each of the following solids pickup of resin: 2, 7, and 10 per cent. The results were comparable.

EXAMPLE 12

The procedures of Examples 1 and 2 were repeated with each of the following solids pickup of catalyst: 0.05, 0.5, 1.0, and 2.5 per cent. The results were comparable.

EXAMPLE 13

The procedures of Examples 1 and 3 were repeated with each of the following extenders instead of the oxidized starch: cationic starch and ethylated starch. The results were comparable.

EXAMPLE 14

The corrugated paperboards prepared by the procedures of Examples 1-7 and 9-13 were converted on corrugated box-making equipment to cartons.

It can be seen from these examples that superior wet rigidity can be imparted to corrugated paperboard by impregnating the medium with a glyoxal-based resin in the presence of a catalyst and, optionally, an extender.

We claim:

1. In a rigid-when-wet corrugated paperboard article comprising impregnated corrugating medium between inner and outer linerboards, the improvement which comprises corrugating medium impregnated with dimethylol dihydroxyethylene urea, partially methylated dimethylol dihydroxyethylene urea, or methylated dimethylol dihydroxyethylene urea as the sole essential impregnant, the corrugating medium containing about 2 to 10 per cent of resin solids based on the weight of the medium, in the presence of a catalyst in the amount of about 1 to 50 per cent based on the weight of the resin solids in the medium.

2. The article of claim 1 wherein an extender is additionally present in the amount of about 1 part per 2 parts of resin solids in the medium.

3. The article of claim 2 wherein the extender is a starch.

* * * * *